(12) United States Patent
Tetteroo et al.

(10) Patent No.: US 11,235,529 B2
(45) Date of Patent: Feb. 1, 2022

(54) OBJECT SUPPORT DURING 3D PRINTING OF AN OBJECT BASED ON A MODEL

(71) Applicant: Atum Holding B.V., Waddinxveen (NL)

(72) Inventors: Ramon Rudolf Tetteroo, The Hague (NL); Tristram Budel, Tilburg (NL)

(73) Assignee: Atum Holding B.V., Waddinxveen (NL)

( * ) Notice: Subject to any disclaimer, the term of this patent is extended or adjusted under 35 U.S.C. 154(b) by 0 days.

(21) Appl. No.: 16/649,915

(22) PCT Filed: Nov. 14, 2018

(86) PCT No.: PCT/NL2018/050762
§ 371 (c)(1),
(2) Date: Mar. 23, 2020

(87) PCT Pub. No.: WO2019/098828
PCT Pub. Date: May 23, 2019

(65) Prior Publication Data
US 2020/0276763 A1   Sep. 3, 2020

(30) Foreign Application Priority Data
Nov. 14, 2017 (NL) ..................... 2019907

(51) Int. Cl.
*B33Y 40/00* (2020.01)
*B29C 64/386* (2017.01)
(Continued)

(52) U.S. Cl.
CPC ............ *B29C 64/386* (2017.08); *B29C 64/40* (2017.08); *B33Y 40/00* (2014.12); *B33Y 50/00* (2014.12);
(Continued)

(58) Field of Classification Search
USPC .......................................... 700/98
See application file for complete search history.

(56) References Cited

U.S. PATENT DOCUMENTS 9,844,917 B2 * 12/2017 Burhop ............. G05B 19/4099
2009/0072447 A1 * 3/2009 Hull ...................... B29C 64/40
264/401
(Continued)

OTHER PUBLICATIONS

Allen et al., "Determination and evaluation of support structures in layered manufacturing" Journal of Design and Manufacturing Issue 5 (1995), pp. 153-162 (Year: 1995).*
(Continued)

*Primary Examiner* — Emilio J Saavedra
(74) *Attorney, Agent, or Firm* — Marcus C. Dawes; Daniel L. Dawes

(57) ABSTRACT

The present disclosure relates to computer implemented method of supporting on support elements during 3D printing on a print platform of a 3D print object to be 3D printed based on a 3D print model, comprising:
obtaining the 3D model by the computer; and
displaying a visual representation of the 3D model on a display connected to the computer,
CHARACTERISED BY
displaying the visual representation of the model with individually user-selectable faces;
receiving, by the computer, input from the user on a selected one of the faces, for support by a minimum number of added support elements to minimize scarring of the object. Based on this input, the computer implemented method proceeds to automatically orient the model, place supports, and 3D print the object from the model. The user is relieved from tedious or cumbersome manipulations of the model before printing.

12 Claims, 2 Drawing Sheets

(51) Int. Cl.
  *B33Y 50/00*      (2015.01)
  *B29C 64/40*      (2017.01)
  *G05B 19/4099*    (2006.01)

(52) U.S. Cl.
  CPC .............. *G05B 19/4099* (2013.01); *G05B 2219/35134* (2013.01); *G05B 2219/49023* (2013.01)

(56) References Cited

U.S. PATENT DOCUMENTS

2016/0263838 A1*  9/2016  Goldman .............. B29C 64/386
2016/0274572 A1*  9/2016  Littrell ................. B29C 64/386

OTHER PUBLICATIONS

EVOK3D, "evok3D—Micro Lesson Magics 16 Manual and Angled supports" YouTube video accessed at https://www.youtube.com/watch?v=ZID6CRJgQCU (12 mins. 34secs.), Published Mar. 30, 2016 (Year: 2016).*

Meshmax, "3D Printing Support Generator in meshmixer 2.0," www.youtube.com/watch?v=aFTyTV3wwsE, Sep. 20, 2013.

Vaidya, "Optimum Support Structure Generation for Additive and Support Removal Constraint," 44th Proceedings of the North American Manufacturing Research Institute of SME, Jun. 27, 2016, p. 1043-1059, v. 5, No. 2016.

MOLD3D, "3D Printing Tips Using the Formlabs Preform Layer Viewer," www.youtube.com/watch?v=jnzKqrZ5qAY, Apr. 23, 2014.

* cited by examiner

○ ADD POSTS
● NO POSTS

OBJECT SUPPORT DURING 3D PRINTING OF AN OBJECT BASED ON A MODEL

BACKGROUND

Field of the Technology

The present disclosure relates to a computer implemented method of supporting on support elements during 3D printing of a 3D print object based on a 3D print model, comprising: obtaining the model by the computer; and driving a 3D printer to print the object to be printed. The present disclosure also relates to a program to be stored on a record carrier and a controller of or for a 3D printer performing the method.

Description of the Prior Art

To the best knowledge of the inventors of the present disclosure, all known 3D printers and methods associated therewith, when an object to be printed in a 3D printer is to be linked to a build platform, arrange the object on support elements or posts, connecting the object to be printed during 3D printing to the build platform. After 3D printing, the 3D printed objects are broken from the supports or posts, leaving visible marks of where the posts were connected to the object during printing, even when the support elements or posts have a shape converging towards the object to minimize the break area and the visual effects thereof. The visible marks require post-processing, after printing, to finish 3D printed objects, which post processing is normally performed manually. This is all the more cumbersome, if the number of support elements or posts is high, and in particular if many support elements support the object during printing at later—after printing—prominently visible faces. The present disclosure has for one an objective of minimising scarring by removal of support elements or posts, in particular in or on faces that are—after printing the 3D printed object—most prominently in view.

From a position of 3D printer manufacturers, this disadvantage of scarring 3D printed objects by breaking the 3D printed objects off the support elements or posts, has to date not been acknowledged or at least not been addressed, since the choice of faces or surfaces on which the scarring effect is to be minimized is subjective, where a user of a 3D printer may at one time wish to prevent scarring of one face or surface of the object, and another face or surface at another time. For such reasons, 3D printer manufacturers have either not acknowledged such issues with their prior 3D printers, or elected to focus arrangement of support elements or posts based on structural and more objective considerations, to provide for sturdy and good support of the object during 3D printing.

Consequently, prior art is limited to methods, controllers and printers with which users need to perform tedious, time consuming and complex manipulation of a displayed representation of the model, as is exemplified in a film on YouTube on, more in particular, the "Mold3D Channel", entitled "3D Printing Tips using the Formlabs Preform Layer Viewer", youtube, 23 Apr. 2014 (2014 Apr. 23), (XP054978544), to be found at the date of filing of the present disclosure on the internet at: URL: https://www.youtube.com/watch?v=jnzKqr Z5qAY, from time mark 5:45. Users are required to orient the model themselves relative to a print platform and then review the model, print layer by print layer, for sufficient support by the support elements, and have to start all over again from re-orienting the model relative to the platform, if insufficient support is encountered at some print layer, where for example an overhang results in a failed print.

BRIEF SUMMARY

However, the inventors of the present disclosure have found a solution to service the needs of the users, concerning leaving faces or surfaces as unscarred as possible, while still also providing a good and sturdy printing support. To this end the present disclosure discloses a computer implemented method of supporting on support elements during 3D printing of a 3D print object based on a 3D print model, comprising features of the appended independent method claim.

Consequently, the user's input is taken into account when the computer automatically orients the model relative to for example a reference, such as a build platform, for printing selected faces or surfaces with as little scarring as possible, while maintaining a good and sturdy support on posts of the object during printing on faces or surfaces, in relation to which a user attributes less importance regarding scarring thereof. Thereto, the user merely needs to select the at least one of the faces of the model in the visual representation thereof, which the user at the particular time of inputting the selection of the at least one face of the model desires to be the least affected by scarring, and thereafter the method enables the computer to print the object from the model, without any tedious or cumbersome manipulations of the user, as in the above references prior art.

Following the above reference to the gist of the present disclosure in terms and expressions of the appended independent method claim, it is to be noted that a diversity of preferred embodiments is defined in the appended dependent method claims, and/or will become apparent from the below embodiment description.

In a potential preferred embodiment, the method further comprises receiving input from the user on movement comprising at least one of translation and rotation of the visual representation of the model, prior to receiving input from the user on the selection of at least one of the faces of the visual representation of the model with respect to addition of support elements.

In a potential preferred additional or alternative embodiment, the method further comprises receiving input from the user on orientation of the object including at least one of translation and rotation of the object during 3D printing, prior to 3D printing, and orienting the extended version of the model during 3D printing based on the received input from the user on the orientation of the object.

In a potential preferred additional or alternative embodiment, the method further comprises orienting the extended version of the model with support elements added thereto for 3D printing, based on the received input from the user with respect to addition of support elements. In such an embodiment the method may comprise orienting the extended version of the model with support elements added thereto for 3D printing of the object relative to a print platform of a 3D printer, from which platform the support elements extend to support the object to be printed. Additionally to or as an alternative for orienting the extended version of the model, the method may comprise: attributing weight factors to the faces based on surface areas of the faces; multiplying orientations of the faces with the corresponding weight factors; averaging normalized bi-rotational axes of the faces; and by adaptation of the orientation, generating an optimized orientation of the model for printing of the object to be printed, which is optimized in relation to the user input with respect to at least the addition of support elements. Additionally or alternatively, the method may comprise: display to the user of the oriented extended version of the model; receiving input from the user on movement comprising at least one of translation and rotation of the oriented extended version of the model within limits to avoid supports at a face selected not to be supported; and adapting the oriented extended version of the model to received input from the user on movement comprising at least one of translation and rotation of the oriented extended version of the model.

In a potential preferred additional or alternative embodiment, generating an extended version of the model with support elements added thereto may comprise: slicing the model; converting features of each slice into at least one of polygons and vectors at locations of the faces; determining at least one point of the model corresponding to a point of the object to be printed closest to a 3D printing platform of a 3D printer. In such an embodiment, the method according to the present disclosure may further comprise: from a slice comprising the point of the model corresponding to a point of the object to be printed closest to a 3D printing platform of a 3D printer, determining directional overhang of subsequent slices by comparing a current layer with a previous layer closer to the build platform, taking the point of the model corresponding to a point of the object to be printed closest to the 3D printing platform of the 3D printer as the origin; and comparing the current layer with the previous layer, and, if the area thereof is larger than the area of the previous layer, it is determined that there is overhang, and when overhang through subsequent slices reaches a predetermined value, arranging a support element in the extended version of the model. Then, the method may further comprise placement of support elements only outside of the periphery of previously placed supports and in slices above the at least one point of the model corresponding to a point of the object to be printed closest to a 3D printing platform of a 3D printer, according to predefined support element patterns.

It is noted here that the present disclosure not only relates to a method, but also to a computer or a 3D printer having a processor and a memory, wherein the memory comprises a program configured to enable the 3D printer to execute the steps of the above method, as well as a record carrier, storing a computer program to enable a computer or a 3D printer, when the computer program is loaded therein, to execute the steps of the above method. In this respect it is noted that the method may be implemented on a separate computer, to provide the outcome to a 3D printer for 3D printing of objects. For example, calculation power required may better be suited for a separate computer than a 3D printer. In such a case the computer separate from the 3D printer is to be considered as a component of or addition to the 3D printer, encompassed by the relevant ones of the appended independent claims.

As a side consideration, it is noted that performing the method on a component of or addition to the 3D printer has advantages in terms of data transfer. 3D models can be extremely large. However, when performing the method on the separate component or additional computer, only slices need to be transmitted together with depth (Z-axis) drive information, where the slices comprise binary information of where and where not to print the object over the cross sectional slices thereof. In this sense the slices can be considered as black-and-white representations of cross sections/slices of objects to be printed, indicating where to print, and where not to. This enables a considerable reduction in data volumes, where only these slices and the depth (Z-axis) drive information need to be sent to the 3D printer.

Before proceeding with the below embodiment description of the appended drawing, reference is made to a number of challenges and solution strategies regarding these challenges, relative to prior 3D printing techniques, in terms of the novel approach to preparing a model for printing and provide (the) correct (type of) support elements or posts.

As a first challenge it is noted that considerable expertise is required to place the support elements or posts on a correct location to support the model properly. As a second challenge it is noted that considerable expertise is required to give the supports each the right shape in order to support the model properly and not waste (a lot of) material through trial and more pertinently: error.

If the model is not supported properly with the right type of supports, the print job will fail and material will be wasted, and for larger objects to be printed or using sparse printing material this would result in considerable loss of much material or a little expensive material.

The present disclosure automates the placing and potentially also shaping of supports.

The process works as follows. A model is provided, for example by loading it into the 3D printer system. The user can choose if the model is to be laid flat and—if so—in what orientation, or if it needs to be auto orientated by the 3D printer.

The user selects which faces are important, this selection method can be used for either selecting the faces on which to lay the model flat or which faces that should be excluded from supports or—to the contrary—should have supports. This way, the inventors of the present disclosure have adopted a novel manner of looking at 3D printing from the perspective of where not to place supports instead of looking where to place supports.

The adopted manner of selecting which faces to use or exclude is considered by the inventors of the present disclosure to be unique to 3D printing. A 2D tool is used on a GUI (graphic user interface) to select one or multiple related faces or surfaces per selection. Faces are related in the aspect that they are all part of the same model.

The selection of which faces are to be selected is done as follows. A 2D box from the angle of view (from the perspective of for example a camera) is used and a real time check is performed for every face that is in or intersects with this box. This follows the logic that only faces or surfaces are selected nearest to the view/camera and surfaces or faces which are facing towards the camera.

Every (de)selected face may be given a colour to indicate that this face is (de)selected.

Regarding the math of 'Selection of faces', the following disclosure is provided:

1) Define 2D Tool boundary box as polygon
2) Nearest intersected triangle:

$$\text{Face}_{intersected} = N_{camera}! = \text{Direction}_{face} \& \text{Distance}_{camera} <= \text{Distance}_{face}.$$

3) Find all neighbour triangles from $\text{Face}_{intersected}$ that has 2D point in 2D Tool boundary box $$-\text{Faces}_{in2dtool} = N_{camera}! = \text{Direction}_{face} \& \text{Distance}_{camera} <= \text{Distance}_{face} \& \text{IsNeighbourFace}_{intersected}$$

4) Update previous selected faces with newly (de)selected faces
5) Mark $\text{Face}_{in2dtool}$ as (de)selected Auto orientation is an aspect of the present disclosure. The orientation is determined as follows:

After selection of these surfaces or faces, the program assigns a factor to each face (3 point spatial plane) that makes up the surface. This factor determines the weight of the orientation of the face and is calculated by the surface area of the face. Optionally, users may be allowed to input factors, to be taken into account when performing the method.

Multiplying the orientation of the face with the factor normalises the face orientation value. Next the average is taken of all the normalized bi-rotational axis of the selected faces in the model, resulting in a single net orientation of the model.

After the auto orientation, it has become possible to provide supports in an automated manner.

Regarding the math of 'Auto orientation', the following is noted:

1) Calc average selected face normals $$N_{total} = \text{Faces}_{selectedin2dtool} * N_{SelectedFacesin2dtool}$$

$$V_{total} = \text{Faces}_{selectedin2dtool} * N_{SelectedFacesin2dtool}$$

$$N_{avg} = \text{Normalise}(N_{total}/V_{total})$$

2) Calc model rotation angle $$\text{Angle}_Z = \text{Tan}(\text{Normal}_{selectedFaceY}, \text{Normal}_{selectedFaceX})$$

$$\text{Matrix}_{rotation} = \text{Matrix}_Z * -\text{Angle}_Z$$

$$\text{Vector}_{rotation} = \text{Normal}_{selectedFace} * \text{Matrix}_{rotation}$$

$$\text{Angle}_Y = \text{Tan}(\text{Vector}_{rotationZ}, \text{Vector}_{rotationX})$$

3) Rotate model using the $\text{Angle}_Z$ and $\text{Angle}_Y$

Regarding the math of Limited (user) bi-axial rotation freedom, the following is noted:

After the model has been automatically (or manually) orientated there is a bi-directional window in which the model can be manually orientated if required by the user or to minimize the needed supports. This movement is limited to the degree that the chance that any selected surface needs supporting is minimised. The window of freedom is the combined result of predefined material settings and selected faces in the model.

This envelope is visualised in the GUI to indicate to the user where the orientation limits are.

Regarding the math of "Lay Flat using auto orientation", the following is noted:

The user may select one or more surfaces (a collection of faces facing the same direction), the orientation of the model is calculated and the model is laid flat on the virtual build platform using this orientation.

Math 'Lay Flat using auto orientation':

1) Calc lay flat rotation angles:

$$\text{Angle}_Z = \text{Tan}(\text{Normal}_{selectedFaceY}, \text{Normal}_{selectedFaceX})$$

$$\text{Matrix}_{rotation} = \text{Matrix}_Z * -\text{Angle}_Z$$

$$\text{Vector}_{rotation} = \text{Normal}_{selectedFace} * \text{Matrix}_{rotation}$$

$$\text{Angle}_Y = \text{Tan}(\text{Vector}_{rotationZ}, \text{Vector}_{rotationX})$$

2) Rotate model using the $\text{Angle}_Z$ and $\text{Angle}_Y$

Identification of the support locations in the model is performed as follows:

In order to calculate the support locations the model is sliced using a predefined layer thickness. Every slice will have features which are converted in to polygons (vectors), each vector has a location.

After slicing and determining the polygons, the current layer is compared to the previous layer when assessing the entire slice stack from bottom to top, the build platform is or carries the first layer.

First the model is analysed for "lowest polygon(s)", a lowest polygon are vectors on a location where in the previous slice (underneath) there was no vector(s)/polygon(s) on that location.

This is an important step.

Next the directional overhang of the subsequent layers is determined. This is done by comparing the current layer with the previous layer. The lowest polygon of the feature is taken as the origin. The current layer is then compared to the previous layer. If the area of the feature is larger than the area of the previous layer then there is/are overhang(s), once the overhang reaches a predetermined value a support location is placed.

Upon further assessing the model once a support is placed the support value is subtracted from the overhang value which should result in zero or less. If the overhang value is more than zero, one or more support will be placed.

The placement of these supports can only be placed outside of the periphery of the previously placed supports and in layers above the lowest polygon(s) according to predefined patterns.

Regarding the math of 'Identification of the support locations in the model', the following is noted:

Step 1: Support point(s) using lowest polygon(s)

1) Determine polygons without polygon below
   a. $\text{Polygon}_{lowest} = !(\text{PointInPolygon}(\text{Polygon}_{currentlayerindex}, \text{Polygon}_{previouslayerindex}))$
2) Determine $\text{SupportPoints}_{polygonlowest}$ in $\text{Polygon}_{lowest}$
   a. (next) polygon offset with 'material overhang value'
      i. When polygon offset exists create support cones on $\text{Polygon}_{offset}$ using 'material support cone distance'
         Goto 2a.
      When polygon offset not exists
         Polygon offset with 'material overhang value/2+ (2*material support cone top radius)'
         When polygon offset exists create support cones on $\text{Polygon}_{offset}$, using 'material support cone distance'
         When polygon offset not exists create support cones using $\text{Polygon}_{lowest}$
3) Polygons above $\text{Polygon}_{lowest}$ which are connected by 3D face connection
   a. $\text{Polygons}_{abovelowestpolygon} = \text{For } (\text{Polygon}_{lowestlayerindex} + (1 \ldots \text{'material property max lowest polygons'})) \& \text{IsConnectedByFaceConnection}$
4) Determine support cone points using 'material property lowest polygon offset values'
   a. For(value in 'material propery lowest polygon offset values') $\text{Polygon}_{intersectionlines}$ from $\text{Polygons}_{abovelowestpolygon}$
   b. When $\text{Polygon}_{intersectionlines} > 0$
      i. Append $\text{SupportPoints}_{polygonlowest}$ on $\text{Polygon}_{intersectionlines}$ using 'material support cone distance'

Step 2: Support point(s) using polygons (start with build-platform layer)
1) Determine polygons $\text{Polygon}_{currentlayer}$ and $\text{Polygon}_{nextlayer}$
2) Determine current supported layer $\text{Polygon}_{supportedlayer} =$
($\text{SupportPoints}_{polygonlowest}$<currentlayer-index)*'material property overhang distance'+
($\text{SupportPoints}_{normal}$*'material property overhang distance')

3) Subtract $\text{Polygon}_{nextlayer}$ with $\text{Polygon}_{currentlayer}$ and $\text{Polygon}_{supported}$ $\text{Polygon}_{difference} = \text{Polygon}_{nextlayer} - \text{Polygon}_{currentlayer} - \text{Polygon}_{supported}$ 4) Append $\text{Polygon}_{difference}\text{SupportPoints}_{normal}$ to $\text{SupportPoints}_{normal}$ Determine $\text{Polygon}_{difference}\text{SupportPoints}_{normal}$ from $\text{Polygon}_{difference}$ using above offset algorithm 5) Remove points from $\text{SupportPoints}_{normal}$ that do not exist in $\text{Polygon}_{nextlayer}$
6) Goto 1 for next layer In general, some unique features of the present disclosure involve:

All calculations may be made according to real world material properties from an existing material library.

As for further features:

All calculations may be performed via asynchronous multi threading, significantly reducing processing time. The determination of the lowest points, the calculation of polygons/vectors, overhang determination, counting polygons, determination of faces that are inside the selection box and colouring of the GUI may all be done via multi threading.

The unique features lead to a new approach and a new way of working to support models for 3D printing.

The new way of working is to load a model, to select with a paintbrush like tool where not to place any supports and getting visual feedback where these supports are not to be placed, then to press a single button, a model for printing an object may automatically be extended with support elements or posts and placed in the ideal position/orientation and after a user's confirmation, supports may also be automatically placed using the available material library to define the extended model.

As for proper model support, the following is noted
Supports need to be placed correctly, otherwise print jobs fail.
Add Model
Lay Flat
→Select 1 or more surfaces
→Calculate surface factor dependent on surface volume (insert math)
→average bi rotational angle by normalising surface angles with surface volumes (insert math).
→auto rotate to lay flat on selected surface (insert math)
Auto Orientate
Select Support-Free Areas
→Use 2D tool on GUI to (de)select one or multiple related faces (3 connected spatial points), creates boundaries
→Check every triangle that intersects the selection box boundaries which are the nearest to the camera, and the triangle normal is facing the camera
→change color of selected faces for visual indication
→Calculate surface factor depended on surface volume
→average bi rotational angle by normalising surface angles with surface volumes (insert math)
→calculate maximum allowable bi rotational axle angles, defined by material properties
→visualise rotation envelope in GUI
→Identify support locations
→Orientate model to minimize supports (insert math)
→Identify support locations
→Calculate lowest point facing down supports (insert math)
→calculate remaining supports from lowest points with overhang (material properties) and predefined offsets (material properties) (insert math)
   Model contour difference, model gaat er van uit dat de vorige laag goed ondersteunt is.
→Divide the model in slices, each slice comprising a number of polygons.
→Check if individual polygons in each slice is carried, referring to underlying layer(s).
→a polygon without being carried by an underlying layer (relative to a build platform) is overhang or a lowest point.
  →when overhang exceeds a threshold relative to a closest support element, supporting an underlying layer, a further support elements needs is to be added. Specific parameters may be involved, such as distance from a closest support element, obliqueness of the overhang, support element patterns, and the like. Preferably support elements are placed at a peripheral edge of an object in a slice, and only in object slices above a lowest point of the object (closest to the build platform of a 3D printer).

About the calculations, the following is noted: all calculations may be performed asynchronously through multi threading, such a determining: —lowest polygon(s) (closest to the build platform) and highest polygon(s) (farthest from the build platform) and object contours in slices, —polygons, —overhang, numbers of polygons, —faces falling inside a selection box, —colouring faces in the selection box of faces having received a selection from the user, and the like. However, calculations for determining support element locations are not subject to asynchronous multi-threading calculations.
Support Shape
→the shape of the support cone is automatically calculated by using the resin properties, support height and calculated load on the support.

BRIEF DESCRIPTION OF THE DRAWINGS

Based on the following disclosure, below an embodiment description is provided, referring to the appended and non-limiting embodiment drawing, in which the same, similar or other reference signs may be attributed to the same or similar aspects components or functions of the present disclosure, and in which.

DETAILED DESCRIPTION OF THE PREFERRED EMBODIMENTS

Figure 1:
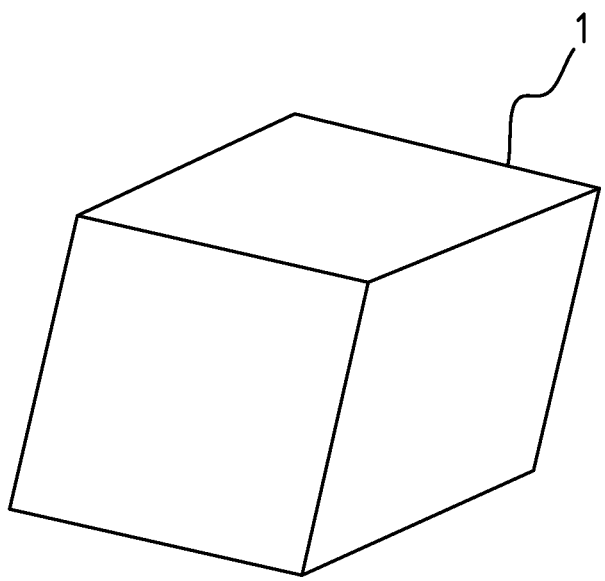
FIG. 1 show 2D display of a model or a printed object to which the model corresponds.

FIG. 1 shows a 2D display of a model 1 of an object to be 3D printed (or the object resulting from 3D printing itself). The present embodiment description will proceed under the assumption that FIG. 1 shows what is displayed in the GUI. In the shown embodiment, the model 1 displayed on a 2D display, such as a display screen in a Graphic User Interface (GUI), is highly simplified as a tilted cube to assist proper understanding of the present disclosure.

Figure 2:
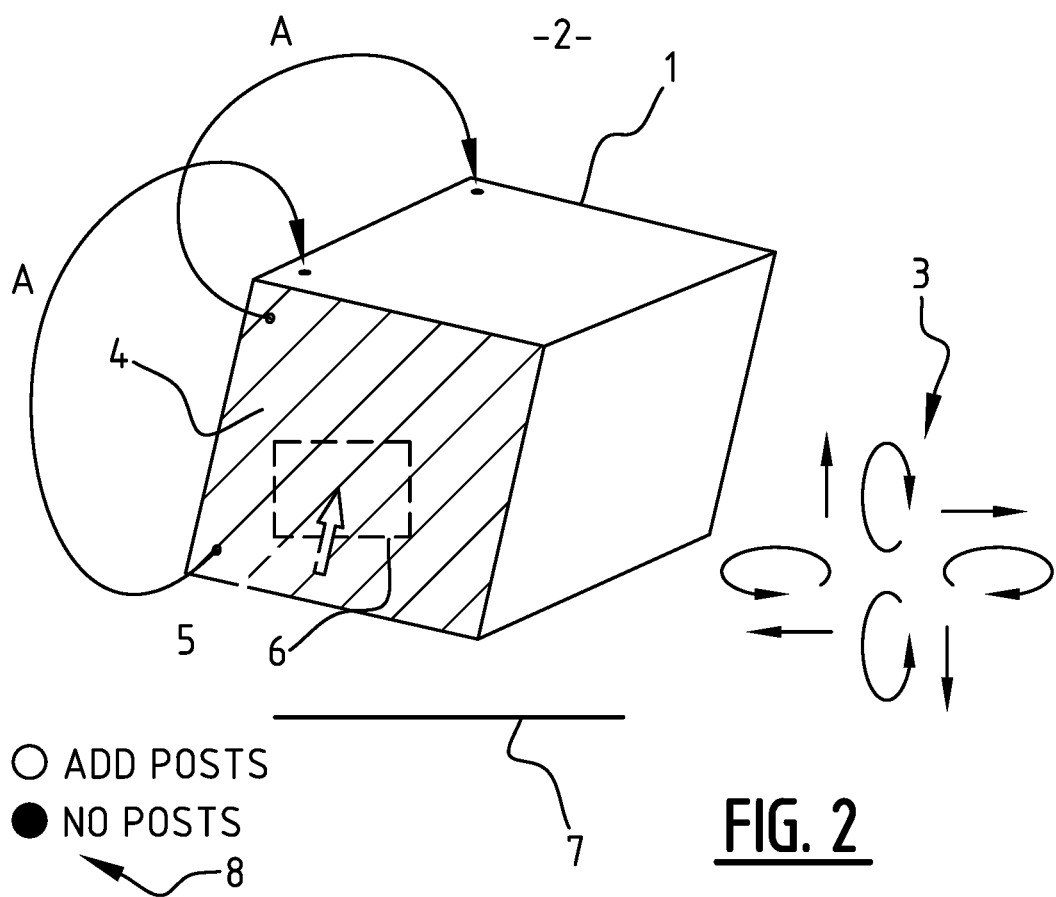
FIG. 2 shows manipulations to be performed by a user on the 2D display of the model of the object to be 3D printed.

FIG. 2 also shows the model 1 being displayed in a Graphic User Interface (GUI) 2, with tools 3, 5, 6, 7, 8 for manipulation. A user is able to manipulate the displayed view of the model 1 using translation and rotation arrows 3, until a surface or face 4 comes into view (from a type of camera perspective) that the user wants to select. Surrounding a cursor 5 is an optional selection box 6. The model 1 is displayed relative to a reference 7, which may correspond with a build platform of a 3D printer. When surface or face 4 has been brought into frontal view, the user may select surface or face 4 to indicate his/her desire to keep a selected face or surface 4 free from support elements or posts 9 by selection of an appropriate option 8 from the possibilities of adding support elements or posts 9 or avoiding support elements or posts 9 at the selected surface or face 4, for example by clicking with the cursor 5 on the desired surface or face 4, and then also placing box 6 or at least cursor 5 on the surface or face 4 to be selected, and clicking again. The order may be reversed. Thereby, the entire surface or face 4 of the model is recognized as a selected surface or face 4 to be kept free—at least as much as possible—of support elements or posts 9. Based on such a received indication, the surface or face 4 may be oriented correspondingly, relative to reference 7 of—for example—the build platform of a 3D printer. For example, prior to actual printing, the model may be rotated along arrows A to position the surface or face 4 as much as possible away from the reference 7. The disclosure therefore provides automatic re-orienting the model 1 relative to the reference 7, to avoid addition of posts 9 at surface or face 4 (as much as possible). Since the user does not need to know the position of the reference 7 for the system, method and functionality of the present disclosure to be achieved, display of the reference 7 may be omitted. The only essential input/output is then that the user can indicate which surface or face 4 is to be kept free from support elements as much as possible. The system of the 3D printer, performing the method of the present disclosure will orient the object relative to the reference.

The user may alternatively orient the object relative to the reference 7, for which display thereof may be important, to indicate thereby which surface(s) or face(s) is/are to be kept free of support elements or posts 9 (as much as possible). Therefore, the user may him- or herself change the orientation of the model 1 relative to the reference 7 using the manipulation keys 3, to set the surface or face 4 at a position and orientation relative to the reference 7, as a consequence of which the number of support elements or posts 9 is minimized in the selected surface or face 4. To allow the user to determine the orientation/position of the model or therefore of the object to be printed during printing relative to the build platform, or other reference 7, the reference should be indicated or visualised otherwise in the Graphic User Interface.

Figure 3:
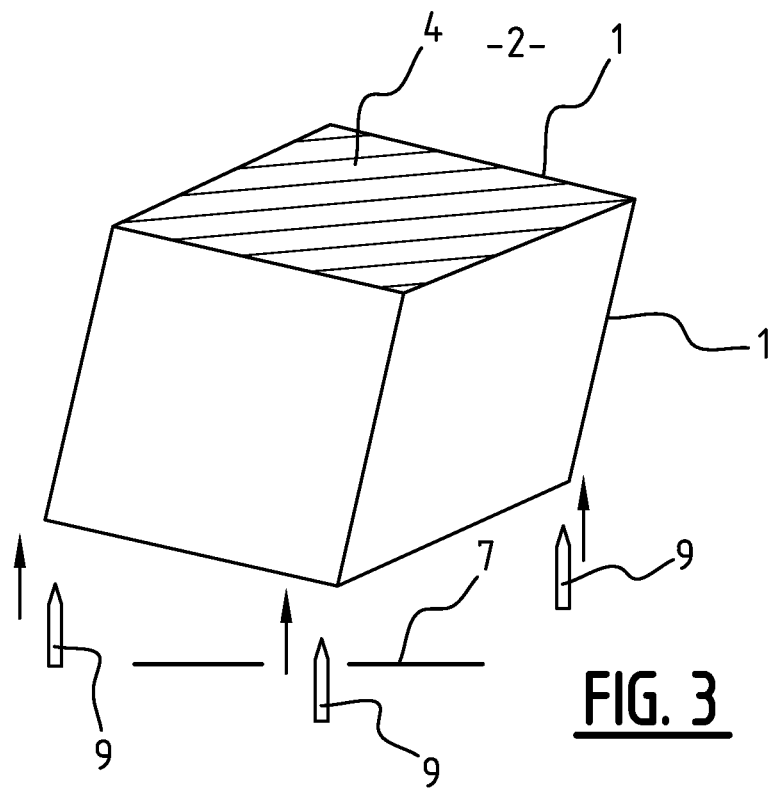
FIG. 3 shows addition of support elements or posts to arrive at an extended model for printing of the object to be printed with the support elements.

When a position and orientation of the model 1 and/or object to be printed relative to the reference 7 is determined, regardless of whether the reference 7 is actually displayed, support elements or posts 9 are added to the model, to provide the 3D printer with an extended model with added posts 9 for 3D printing of a supported object, in the above described manner, as shown in FIG. 3.

Figure 4:
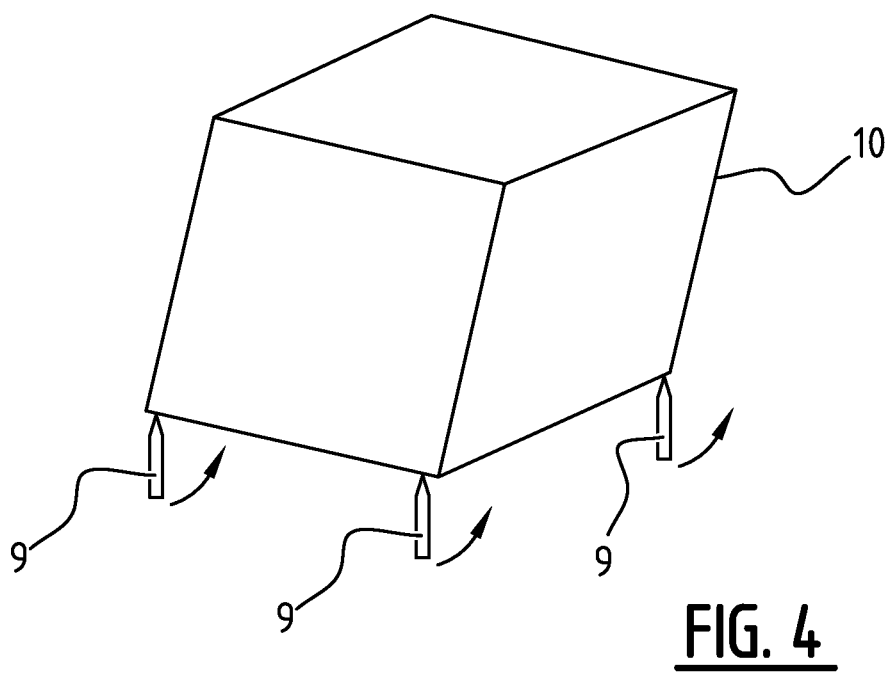
FIG. 4 shows breaking off of the support elements after 3D printing.

After 3D printing of the supported object, based on the extended model 1 of the object with support elements or posts 9, the posts 9 may be broken off as shown in FIG. 4. Breaking off the posts 9 often leaves visible marks, which is why the present disclosure enables a purposeful selection by a user of surfaces or faces 4 which are to be kept free, at least as much as possible, of support elements or posts 9, as these more visible surfaces or faces of the object then need a minimum of (or even no) further processing, in particular smoothening.

Based on the above disclosure, the scope of protection is defined in the appended claims, and in particular the independent claims. Therefore, the scope is in no way to be limited to any features from the above strategic approach or embodiments description, if not defined in the appended independent claims, and may even encompass, in particular for some jurisdictions, also obvious alternatives, presently not foreseen to be disclosed.

The invention claimed is:

1. A computer implemented method of supporting on support elements during 3D printing on a print platform of a 3D print object to be 3D printed based on a 3D print model, comprising:
   obtaining the 3D model by the computer,
   displaying a visual representation of the 3D model on a display connected to the computer;
   displaying the visual representation of the 3D model comprising a plurality of faces of the visual representation, which plurality of faces are individually selectable by a user;
   receiving, by the computer, input from the user corresponding to a selection made with at least one paintbrush-like selection tool surrounding a cursor on at least one of the plurality of faces of the visual representation of the model on the display, wherein the input from the user results in at least one of the plurality of faces to be supported by a minimum number of added support elements to minimize scarring of the object by removal of the support elements after printing;
   orienting, automatically by the computer, the 3D model relative to a reference for printing the resulting at least one of the plurality of faces with the minimum number of support elements;
   generating, automatically by the computer, an extended version of the model with support elements added thereto for printing the object with the support elements, with the resulting at least one of the plurality of faces supported by the minimum number of added support elements; and
   3D printing the extended version of the model.

2. Method according to claim 1, further comprising receiving input from the user on movement comprising at least one of translation and rotation of the visual representation of the model, prior to receiving the input from the user on the selection of at least one of the faces of the visual representation of the model with respect to addition of the minimum number of support elements.

3. Method according to claim 1, further comprising receiving input from the user on orientation of the object including at least one of translation and rotation of the object during 3D printing, prior to 3D printing, and orienting the extended version of the model during 3D printing based on the received input from the user on the orientation of the object.

4. Method according to claim 1, further comprising displaying a coloring in the paintbrush-like selection tool surrounding the cursor after having been selected by the user.

5. Method according to claim 4 comprising orienting the extended version of the model with support elements added thereto for 3D printing of the object relative to the print platform of a 3D printer, from which platform the support elements extend to support the object to be printed.

6. Method according to claim 4, comprising:
attributing weight factors to the faces based on surface areas of the faces;
multiplying orientations of the faces with the corresponding weight factors;
averaging normalized bi-rotational axes of the faces; and
by adaptation of the orientation, generating an optimized orientation of the model for printing of the object to be printed, which is optimized in relation to the user input with respect to at least the addition of the minimum number of support elements for the selected at least one of the faces.

7. Method according to claim 4, further comprising:
displaying to the user of the oriented extended version of the model;
receiving input from the user on movement comprising at least one of translation and rotation of the oriented extended version of the model within limits to avoid supports at a face selected not to be supported; and
adapting the oriented extended version of the model to received input from the user on movement comprising at least one of translation and rotation of the oriented extended version of the model.

8. Method according to claim 1, wherein generating an extended version of the model with the minimum number of support elements added thereto comprises:
slicing the model;
converting features of each slice into at least one of polygons and vectors at locations of the faces; and
determining at least one point of the model corresponding to a point of the object to be printed closest to a 3D printing platform of a 3D printer.

9. Method according to claim 8, further comprising:
from a slice comprising the point of the model corresponding to a point of the object to be printed closest to a 3D printing platform of a 3D printer, determining directional overhang of subsequent slices by comparing a current layer with a previous layer closer to the build platform, starting from the point of the model corresponding to a point of the object to be printed closest to the 3D printing platform of the 3D printer; and
comparing the current layer with the previous layer, and, if the area thereof is larger than the area of the previous layer, it is determined that there is overhang, and when overhang through subsequent slices reaches a predetermined value, arranging a support element in the extended version of the model.

10. Method according to claim 9, further comprising placing the minimum number of support elements only outside of the periphery of previously placed supports on the overhang and in slices above the at least one point of the model corresponding to a point of the object to be printed closest to a 3D printing platform of a 3D printer, according to predefined support element patterns.

11. A controller for a 3D printer having a processor and a memory, wherein the memory comprises a program configured to enable the controller to drive the 3D printer to execute the steps of the method according to claim 1.

12. A non-transitory computer-readable storage medium storing a computer program configured to enable a controller for a 3D printer having a processor and a memory to execute the steps of method according to claim 1, when the computer program is loaded from the storage medium into the memory.

* * * * *